United States Patent [19]
Salemme

[11] 3,735,559
[45] May 29, 1973

[54] SULFONATED POLYXYLYLENE OXIDE AS A PERMSELECTIVE MEMBRANE FOR WATER VAPOR TRANSPORT

[75] Inventor: Robert M. Salemme, Schenectady, N.Y.

[73] Assignee: General Electric Company, Schenectady, N.Y.

[22] Filed: Feb. 2, 1972

[21] Appl. No.: 222,754

[52] U.S. Cl............................................55/16, 55/158
[51] Int. Cl. ...............................................B01d 53/22
[58] Field of Search ..................55/16, 158; 210/321, 210/500

[56] References Cited

UNITED STATES PATENTS

| | | | |
|---|---|---|---|
| 3,259,592 | 7/1966 | Fox et al. | 260/2.2 |
| 3,604,246 | 9/1971 | Toven | 55/16 |
| 3,691,068 | 9/1972 | Cross | 210/500 |

Primary Examiner—Charles N. Hart
Attorney—John F. Ahern, Charles T. Watts, Leo I. MaLossi et al.

[57] ABSTRACT

Sulfonated polyxylylene oxide membranes are very effective for the separation of water vapor from other gases. Such a gas separation is very selective and may be readily accomplished at atmospheric pressure. Membrane devices for humidifying or drying an air stream are described.

8 Claims, 5 Drawing Figures

3,735,559

3,735,559

SULFONATED POLYXYLYLENE OXIDE AS A PERMSELECTIVE MEMBRANE FOR WATER VAPOR TRANSPORT

BACKGROUND OF THE INVENTION

Humidity control is a widespread problem. One area of particular concern is that in which it is desired to remove water vapor from air to provide dry air samples for analysis for specific gas content.

Determining the sulfur dioxide content of air is typical of these analyses. A gas analyzing system utilizing a pair of permselective gas separating membranes to enrich the components to be detected is disclosed in U.S. Pat. No. 3,398,505 — Llewellyn. When such an apparatus is used to analyze air for the detection of certain gases, such as sulfur dioxide, it is important that the air samples be dry and that the drying be effected without significant change in the concentration of the gas of interest.

SUMMARY OF THE INVENTION

The latter problem is uniquely solved by utilizing a sulfonated polyxylylene (also referred to as "polyphenylene") oxide membrane to dry the gas being analyzed. The membrane, being highly selective, removes the water vapor without significantly affecting the concentration of the rest of the gaseous components. A drier device utilizing sulfonated polyxylylene oxide membranes for removing water vapor at atmospheric pressure is described.

BRIEF DESCRIPTION OF THE DRAWING

Objects and advantages of this invention will be apparent to those skilled in the art from consideration of the following description taken in connection with the accompanying drawing wherein.

DESCRIPTION OF THE PREFERRED EMBODIMENT

Figure 1:
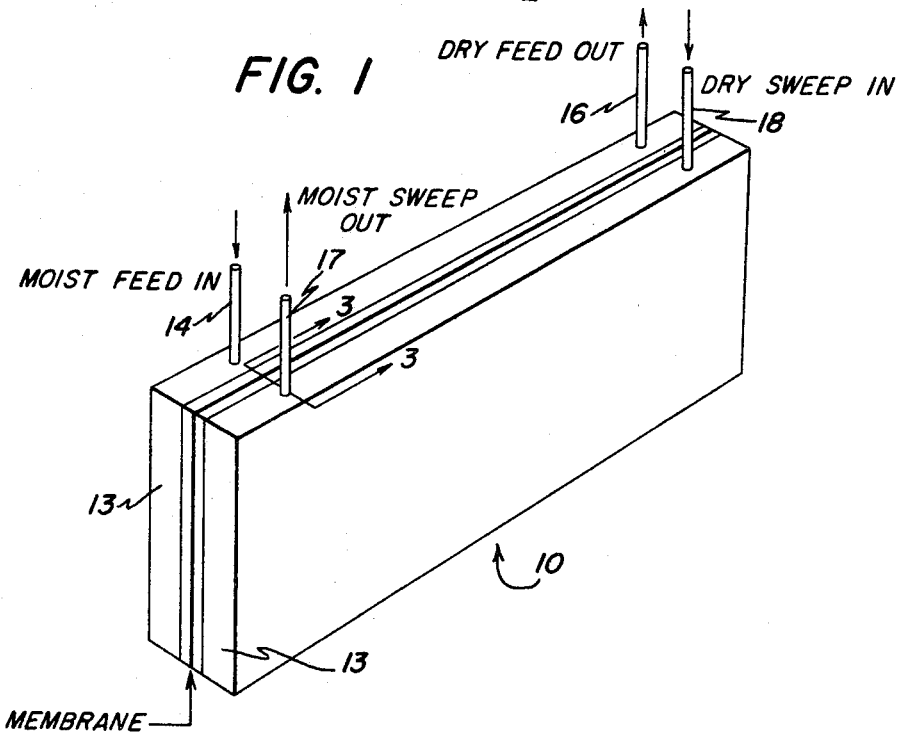
FIG. 1 is a three-dimensional view of a single layer membrane device.
Figure 2:
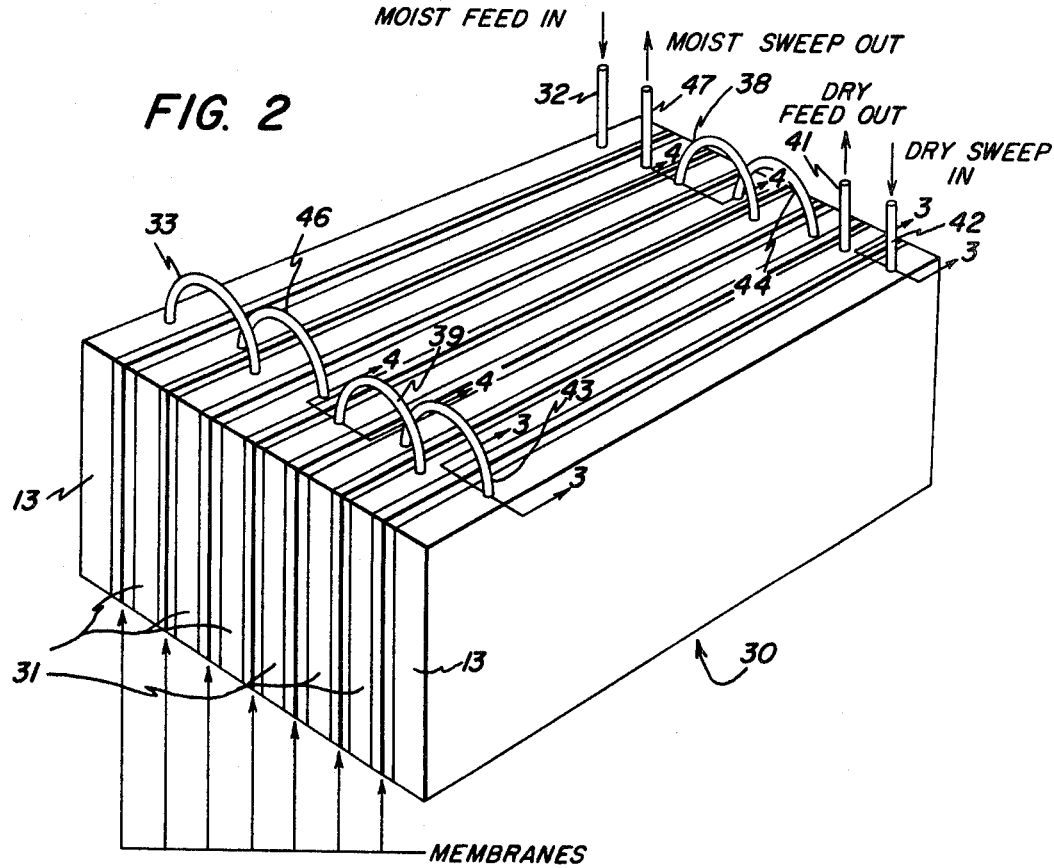
FIG. 2 is a three-dimensional view of a multi-layer membrane device.

The preparation of arylene oxide polymers (specifically poly 2,6-dimethylphenylene oxide, referred to hereinafter as "polyxylylene oxide") is described in U.S. Pat. No. 3,350,844 — Robb. The use of thin membranes of polyxylylene oxide for helium recovery from natural gas, for the separation of hydrogen from deuterium or tritium and for the separation of nitrogen from air is also described in the Robb patent (incorporated by reference).

Polyxylylene oxide is readily sulfonated using chlorosulfonic acid as the sulfonating agent. The basic method has been described in the patent literature (U.S. Pat. No. 3,259,592 — Fox et al) and more recently in a report by Plummer, Kimura, and LaConti [Development of Sulfonated Polyphenylene Oxide Membranes for Reverse Osmosis - Final Technical Report under O.S.W. Contract 14-01-001-2114 (Jan. 1970)].

The chemical reaction involved is

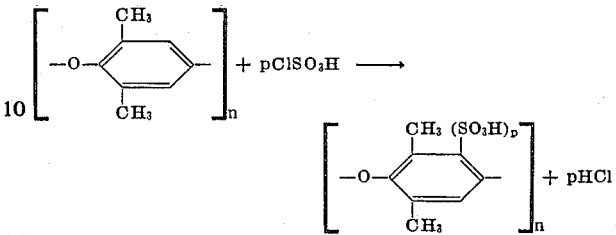

where $p$ may vary from 0 to 1. Essentially, polyxylylene oxide is dissolved in chloroform, and the sulfonating agent, $ClSO_3H$ diluted with $CHCl_3$, is added dropwise to the stirred polymer solution. As the reaction proceeds, the initially golden liquid becomes red, and then brown. As the degree of sulfonation increases, a polymer-rich phase separates, and finally when the ion exchange coefficient (IEC) approaches 3, polymer begins to precipitate from solution. The sulfonation reaction can be terminated at any time so that polymer of a particular IEC may be recovered from the reaction mixture. The reaction is exothermic, but when the $ClSO_3H$ mixture is added dropwise, overheating is not a problem, and the reaction may be run at room temperature.

Sulfonated polyxylylene oxide is an ion exchange material with the unique property of being solvent castable into a film. When this ion exchange material is placed in water, the active groups dissociate and the counter ion becomes mobile and subject to displacement by other cations which may be present in solution. Thus, films of sulfonated polyxylylene oxide may be readily converted to a number of different counter ion forms. However, the hydrogen ion form of sulfonated polyxylylene oxide is unstable. The degradation reaction involves sulfone formation with accompanying cross linking with liberation of $H_2SO_4$. COnversion to a different counter ion form is effected by soaking a sulfonated polyxylylene oxide film of the hydrogen ion form in 200–300 ml of a 1 molar solution containing the desired cation for 24 hours. Thereafter the film is rinsed in distilled water to remove any ions not chemically bound to the polymer.

The sulfone-forming reaction does not take place when the polymer is in a salt form. Conversion to a stable salt form can generally be accomplished by contacting the solid polymer with an aqueous salt solution containing an excess of the desired counter ion. If a base such as sodium or potassium hydroxide solution is used, an excess is not required, because the hydrogen ion concentration in solution will be maintained at a low level through neutralization with the hydroxyl ion. After equilibrating the polymer with the salt solution, the solid is rinsed with distilled water to remove excess electrolytes, and dried.

Once the polymer has been converted to a stable salt form, it can be stored for long periods of time and may be heated to moderate temperatures for reasonable lengths of time without decomposition, discoloration, or crosslinking.

Membranes prepared from sulfonated polyxylylene oxide (IEC = 2.3 mequiv/gm) were cast on clean glass plates using a doctor blade set with a 7 to 10 mil space between the casting plate and the blade. Film was cast from a 10 percent weight polymer solution in which the solvent consisted of 2 parts $CHCl_3$ and 1 part $CH_3OH$ by weight. Immediately after casting, the plate was covered over with an inverted glass dish to decrease the rate of solvent evaporation. This method produced clear, smooth films 0.5 to 1 mil thick.

When the membrane had dried thoroughly, disks of the appropriate size were cut using a razor blade and these membrane disks were lifted from the glass plate. A current of moist air directed onto the membrane facilitates its removal from the plate. Alternately, the membrane may be floated from the plate by immersion in water.

Although many humidifying or dehumidifying applications of sulfonated polyxylylene oxide are contemplated (because of the selectivity and extremely high permeability of this material, which will exceed 30,000 $\times 10^9$ [cc(RTP), cm thick/sec, sq cm, $\Delta P$ (cm Hg)] for a membrane having an IEC of 2.3 mequiv/gm at water vapor pressures of about 20 mm Hg), drier devices and details thereof intended particularly for operation at atmospheric pressures are shown by way of example in FIGS. 1–4.

Figure 3:
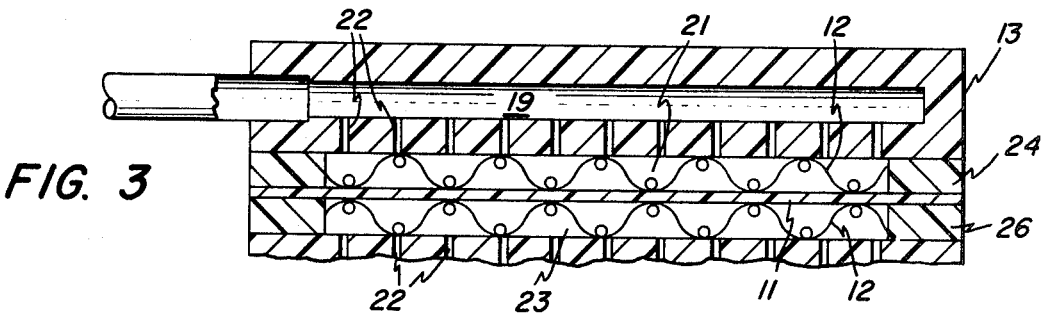
FIG. 3 is a sectional view taken on line 3—3 (representing a section at any of the manifolding stations via which fluid is distributed to one side only of the backup plate)

Drier 10 employs a single sulfonated polyxylylene oxide membrane 11 flanked on either side by spacer screens 12 as shown in FIG. 3. The screen/membrane assembly is sandwiched between a pair of backup plates 13 each of which is provided wit a manifolding system shown in detail in FIG. 3. FIG. 3 is intended to represent the structural arrangement of any one of the manifolding systems in communication with conduits 14, 16, 17, 18. The identification of feed gas passageways and sweep gas passageways relative to the manifold 19 will, of course, vary depending on where the section 3—3 is taken. The system is readily adaptable to either co-current or counter-current flow and the arrangement of fluid inputs and outputs shown is for counter-current flow.

Thus, the moist feed gas enters conduit 14, passes into manifold 19 and is transmitted to space 21 via small closely spaced holes 22 into contact with one major surface of the nonporous sulfonated polyxylylene oxide membrane 11. As this gas feed moves along membrane 11, water vapor goes into solution in membrane 11, is transmitted therethrough and leaves membrane 11 to enter space 23 to enter the sweep gas flow passing over the opposite major surface of membrane 11. As the incoming moist gas flow moves along space 21 toward the opposite end of drier 10 it gradually loses its moisture content through membrane 11 due to the transmembrane water vapor gradient established by the use of a dry sweep gas as is described hereinbelow and, at the other end of drier 10 the raffinate, the dried gas flow, moves through holes 22 into the manifold 19 in flow communication with conduit 16.

At the same time, the dry sweep gas enters drier 10 via conduit 18, passes to adjacent space 23, after traversing a manifold 19 and its holes 22, to pass over the surface a membrane 11 picking up water vapor leaving the membrane after transport therethrough. This sweep gas makes its way to moist sweep gas exhaust pipe 17 via the manifolding system (manifold 19 and holes 22) connected thereto. Spaces 21 and 23 are defined around their perimeters by gaskets 24, 26, respectively, held in place by adhesive. Layers 24, 26 are adhered on both sides in order to seal passages 21, 23 and to hold the unit together. Additional face plates and bolts may be used to enclose drier 10, if desired. Gaskets 24, 26 may be made of any engineering plastic (e.g. polyvinyl chloride), metal foil or other inert material that will give appropriate spacing for passages 21, 23 and will provide the desired area for adhesion.

Figure 4:
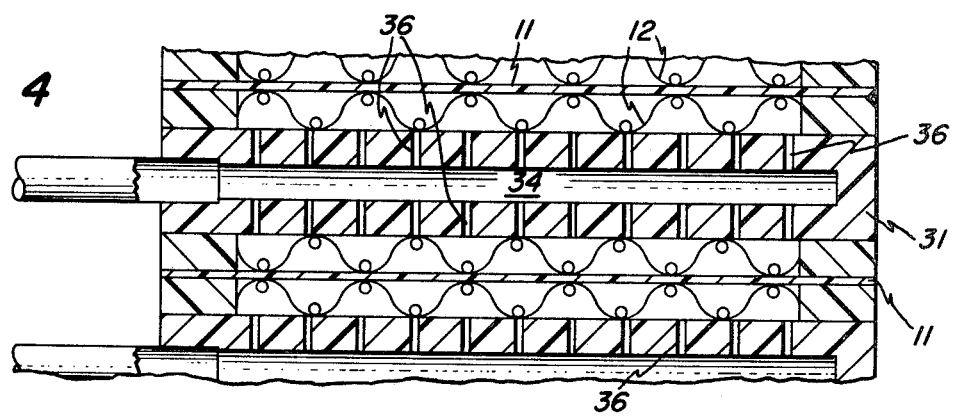
FIG. 4 is a sectional view taken on line 4—4 (representing a section at any of the manifolding stations via which fluid is distributed to both sides of the backup plate) and FIG. 5 is a graphic comparison of the water vapor permeabilities of sulfonated polyxylylene oxide and cellulose acetate.

In most applications, large membrane areas are required. This may be accomplished either by interconnecting several units 10 either in series or in parallel or by the use of structures such as device 30 shown in FIG. 2. This device 30 consists of a number of screen assemblies disposed between backup plates as shown. The two outside backup plates 13 (and their manifolding systems) are the same as the backup plates employed in drier 10, while the construction of the intermediate backup plates 31 is shown in section in FIG. 4 is intended to represent the structural arrangement of either of the manifolding systems in communication with conduits 41 and 47. In the case of conduit 41 the passageways X adjacent both sides of the backup plate 31 are feed gas passageways 21, while in the case of conduit 47, the passageways adjacent both sides of the backup plate 31 are sweep gas passageways 23. As will be described hereinbelow the construction od drier 30 provides a series of feed gas passageways 21 in flow communication via a first set of connecting by-passes, as well as a series of sweep gas passageways 23 in flow communication via a second set of connecting by-passes. The by-passes may be made of any suitable structural matrial, e.g. metal.

The moist feed gas enters conduit 32, passes into space 21 via a manifold 19 (and holes 22), traverses the length of drier 30 and leaves space 21 via the set of holes 22 and manifold 19 connected to by-pass 33. The feed gas then enters an intermediate backup plate 31 passing into manifold 34 and being dispersed therefrom via holes 36 to spaces 21 located one on each side of backup plate 31. The feed gas then traverses the length of drier 30 passing over the faces of adjacent membranes 11 on the way to by-pass 38 via the holes 36 and manifold 34 connected thereto.

By-pass 38 is connected to another intermediate backup plate 31 and the gas feed passing through by-pass 38 enters the indicated backup plate 31 for movement via its manifold 34 and holes 36 to passages 21 on either side of that particular backup plate 31. The gas flow continues in the manner described hereinabove transferring to yet another intermediate backup plate 31 via by-pass 39 and leaving the same as dry feed gas via conduit 41.

Each membrane 11 in the system forms one wall of a passage 21 and thereby has one major surface thereof exposed to the feed gas. Similarly, the opposite side of each membrane 11 forms one wall of a passage 23 and is traversed by the sweep gas. The sweep gas enters through conduit 42 and passes to the backup plates 31 that are interleaved between those backup plates in flow communication with the gas feed. Thus, the sweep gas entering conduit 42 traverses by-passes 43, 44 and 46, leaving and reentering the backup plates 31 interconnected by these by-passes, after traversing the several spaces 23 in flow communication therewith. The sweep gas having picked up the water vapor, which had passed through the several membranes 11, then leaves drier 30 via conduit 47.

These drier constructions are preferably operated at atmospheric pressure with the transmembrane gradient for the permeating specie (water vapor) being maintained by the use of dry sweep gas as described hereinabove.

Although not shown in the drawing, the sweep gas entering either conduit 42 or conduit 18 will previously have been passed through a column of commercially available desiccant or subjected to other drying techniques such as will supply a sweep gas having a dew point of 31 100°F (equivalent to 0.005 percent relative humidity). The extent of dryness of the sweep gas fixes the lower limit to which the feed gas can be dried.

The principal advantage of using a dry sweep gas as opposed to employing a pressure differential to remove water from the gas feed is one of economics. Also, a smaller, lighter system may be employed when dry sweep gas is utilized.

Initially it was found that upon cycling sulfonated polyxylylene oxide membranes from a condition in which the membranes are essentially saturated with water (during operation) to a dry condition (after shutdown), frequent membrane ruptures were encountered. Investigation disclosed that these ruptures occurred because, when the membrane is dried after having been in a wet condition, the linear dimensions of the membrane seek to become smaller than the original dry dimensions. When this shrinkage force exceeds the maximum extensibility of the membrane, the membrane would rupture. This linear shrinkage will amount to as much as 24 percent after repeated humid gas/dry gas cycling. The value for percent elongation of sulfonated polyxylylene oxide polymer film before rupturing will occur is slightly less than this 24 percent value.

It has been discovered that the greatest linear shrinkage occurs when a sulfonated polyxylylene oxide film is dried for the first time, after being in the wet condition and, thereafter, asymptotically appraoches a maximum value as the film is repeatedly cycled. Thus a solution to the problem of membrane rupturing has been found wherein the membranes are pre-treated by moisture cycling prior to clamping the membranes in a device of fixed geometry. Once this initial shrinkage has taken place, membranes may be permanently mounted in a package of fixed dimensions without danger of membrane rupture due to subsequent moisture cycling.

The pre-treatment consists of soaking the sulfonated polyxylylene oxide membrane in distilled water at room temperature until fully swollen and then permitting the membrane to dry. Even after a single sequence of soaking and drying the membrane can be mounted and subjected to repeated moisture cycling without adverse affects.

Figure 5:
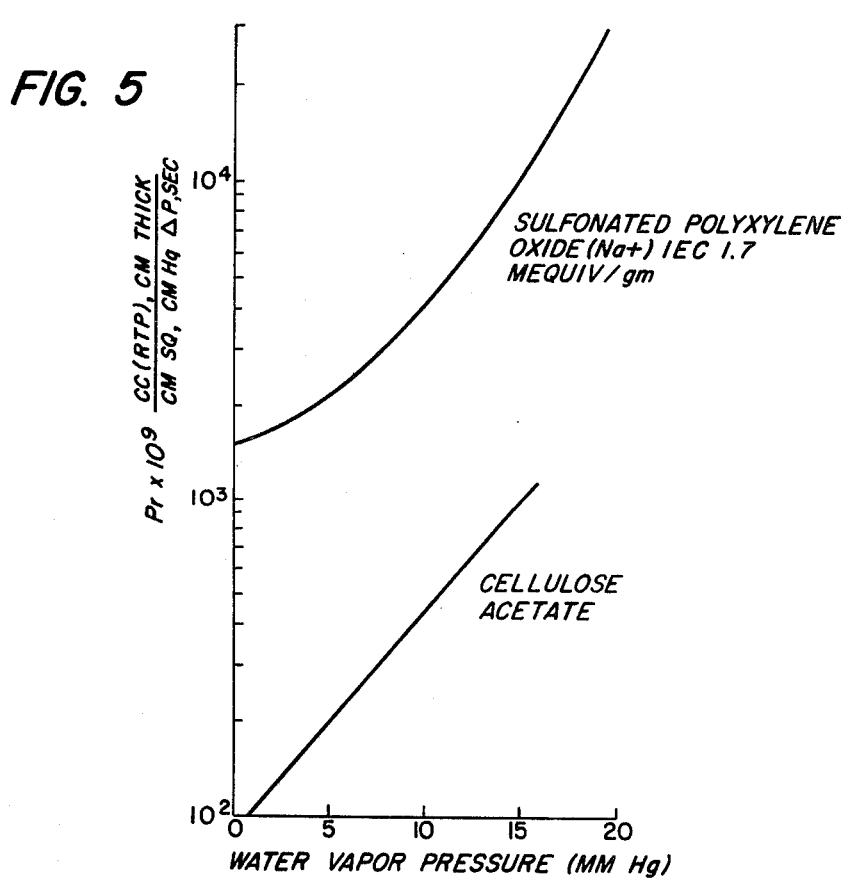

The pronounced hydrophilic nature of sulfonated polyxylylene oxide membrane is due to the presence of ionic (anion) groups. This characteristic appears to be responsible for the phenomenal permeability of this material to water vapor; a comparison of the water vapor permeabilities of a sulfonated polyxylylene oxide membrane (prepared with a sodium counter ion) and a cellulose acetate membrane are presented in FIG. 5. Sulfonated polyxylylene oxide membranes prepared with other counter ions (e.g. $K^+$, $Li^+$, $Cs^+$, $Sr^{++}$, $Mg^{++}$, $Ca^{++}$, $Ba^{++}$, $Co^{++}$, $Ni^{++}$, $Cu^{++}$, $Cr^{+++}$, $Fe^{+++}$, and $Sn^{++++}$) may also be satisfactorily employed.

Thus, to dry a stream of air containing 1 ppm $SO_2$, which is saturated with water vapor at room temperature, and being supplied at a flow rate of 5 cc (23°C, atmospheric pressure)/sec, less than 1 square foot of sulfonated polyxylylene oxide membrane (IEC 1.7) area and 0.01 percent relative humidity sweep gas moving at 50 cc/sec is required to produce 0.5 percent (or less) relative humidity air flow with minimal loss of $SO_2$ from the air stream.

In tests conducted in a four-membrane unit (four units 10 arranged with all feed gas passages connected together in one set for series flow therethrough and all sweep gas passages connected together in a second set for series flow therethrough) a stream of air saturated with water vapor at room temperature was supplied at a flow rate of 1 liter/min (23°C, atmospheric pressure). Dry nitrogen (0.04 percent relative humidity) was used as the sweep gas at a flow rate of 2 liters/min (23°C, atmospheric pressure). The total membrane area was 200 sq. cm. and the raffinate feed gas had a relative humidity of 0.3 percent at 20°C.

It has been adequately demonstrated that sulfonated polyxylylene oxide membrane material functions as a superior semi-permeable barrier for selectively removing water vapor from (or adding water vapor to) a gas stream.

Permeation measuremnts with sulfonated 2,6-diphenyl polyphenylene oxide membranes has shown that this membrane material appears to behave in a similar manner with respect to the transmission of water vapor. The 2,6-diphenyl polyphenylene oxide material may be sulfonated in the manner described hereinabove for the sulfonation of polyxylylene oxide. Sulfonated 2,6-diphenyl polyphenylene oxide, like sulfonated polyxylylene oxide is an ion exchange material, may be solvent cast and converted to various counter ion forms. It may be of particular value to utilize sulfonated 2,6-diphenyl polyphenylene oxide membranes in drier devices exposed to ultraviolet radiation or heat.

I claim:

1. In a process for the alteration of the composition of a mixture of gases wherein the initial mixture of gases is brought into contact with one side of a nonporous permeable membrane for reduction of the water vapor content of said gas mixture, the steps consisting of:
   a. employing as the permeable membrane a membrane made of a material selected from the group consisting of sulfonated polyxylylene and sulfonated 2,6-diphenyl polyphenylene oxide and
   b. maintaining a transmembrane gradient in water vapor across said membrane.

2. The process of claim 1 wherein the membrane has been pre-shrunk.

3. The process of claim 1 wherein the transmembrane gradient in water vapor is maintained by the use of a dry sweep gas flow over the downstream side of the membrane.

4. The process of claim 1 wherein the membrane is a sodium counter ion membrane.

5. Apparatus for altering the composition of a gas mixture comprising in combination:
   a. a plurality of spaced, flat longitudinally extending plates with major flat surfaces thereof disposed in juxtaposition,
   b. at least one thin, nonporous permeable membrane, said at least one membrane being disposed between and spaced from two of said plates,
   c. means extending around the periphery of said at least one membrane for sealing and fixing the dimension of separate gas passages extending on each side of said at least one membrane between said plates and the membrane disposed therebetweeen, d. each of said plates having a pair of spaced manifold systems, one manifold system being located adjacent opposite ends of said at least one membrane, each manifold system consisting of a cylindrical recess extending internally of said plate in a direction substantially parallel to said flat surfaces and a series of small, closely-spaced ports extending from said cylindrical recess to any gas passage contiguous to said plate and e. means connected to each of said cylindrical recesses for establishing gas flow communication therewith.

6. The apparatus as recited in claim 5 wherein the at least one membrane is made of a material selected from the group consisting of sulfonated polyxylylene oxide and sulfonated 2,6-diphenyl polyphenylene oxide.

7. The apparatus as recited in claim 5 wherein two separate sets of gas passages are employed, each set of passages comprising a plurality of separate gas passages in flow communication with each other.

8. The apparatus as recited in claim 7 wherein the passages in each set of passages are connected for series flow of gas therethrough.

* * * * *